United States Patent
Park et al.

(10) Patent No.: US 10,674,364 B2
(45) Date of Patent: Jun. 2, 2020

(54) OPERATION METHOD FOR PREVENTING LATENT ERRONEOUS OPERATION OF TERMINAL IN WIRELESS COMMUNICATION SYSTEM, AND APPARATUS FOR SAME

(71) Applicant: LG ELECTRONICS INC., Seoul (KR)

(72) Inventors: Sangmin Park, Seoul (KR); Taehun Kim, Seoul (KR); Myungjune Youn, Seoul (KR); Jaewook Lee, Seoul (KR); Jaehyun Kim, Seoul (KR)

(73) Assignee: LG Electronics Inc., Seoul (KR)

( * ) Notice: Subject to any disclaimer, the term of this patent is extended or adjusted under 35 U.S.C. 154(b) by 40 days.

(21) Appl. No.: 16/060,238

(22) PCT Filed: Nov. 16, 2016

(86) PCT No.: PCT/KR2016/013176
§ 371 (c)(1),
(2) Date: Jun. 7, 2018

(87) PCT Pub. No.: WO2017/104980
PCT Pub. Date: Jun. 22, 2017

(65) Prior Publication Data
US 2018/0359643 A1   Dec. 13, 2018

Related U.S. Application Data

(60) Provisional application No. 62/266,719, filed on Dec. 14, 2015.

(51) Int. Cl.
*H04W 12/10* (2009.01)
*H04W 12/12* (2009.01)
(Continued)

(52) U.S. Cl.
CPC ............ *H04W 12/10* (2013.01); *H04W 12/12* (2013.01); *H04L 63/1466* (2013.01); *H04W 36/08* (2013.01); *H04W 48/02* (2013.01)

(58) Field of Classification Search
CPC ...... H04W 48/02; H04W 12/12; H04W 36/08; H04W 12/10; H04L 63/1466; H04L 65/1006; H04L 65/1016; H04L 65/1066
See application file for complete search history.

(56) References Cited

U.S. PATENT DOCUMENTS

| 8,656,169 B2 | 2/2014 | He |
| 2013/0029632 A1 | 1/2013 | Tiwari |
| 2014/0153408 A1* | 6/2014 | Jun ............... H04L 65/1066 370/250 |

FOREIGN PATENT DOCUMENTS

| CN | 101984718 A | * 3/2011 |
| KR | 10-2010-0021384 A | 2/2010 |

(Continued)

OTHER PUBLICATIONS

C1-160282, XP051061586: 3GPP TSG WG1 Meeting #95bis, Nashville, TN, USA, Jan. 11-15, 2016, LG Electronics, "Reception of duplicate response in potential DoS scenerio," pp. 1-4.

(Continued)

*Primary Examiner* — Margaret G Mastrodonato
(74) *Attorney, Agent, or Firm* — Dentons US LLP

(57) ABSTRACT

Disclosed are a terminal operation method and a terminal which: transmit an EMM request message to a network entity; at the same time as transmitting the EMM request message, start a timer for detecting a case in which an EMM response message is not received; receive the EMM response message to which integrity protection is not applied; and wait for an additional EMM response message while operating the timer without stopping the timer.

12 Claims, 10 Drawing Sheets

(51) Int. Cl.
    *H04L 29/06*     (2006.01)
    *H04W 48/02*     (2009.01)
    *H04W 36/08*     (2009.01)

(56) References Cited

FOREIGN PATENT DOCUMENTS

| | | |
|---|---|---|
| WO | 2008054668 A2 | 5/2008 |
| WO | 2015037882 A1 | 3/2015 |

OTHER PUBLICATIONS

C1-153380, XP050997117: 3GPP TSG-CT WG1 Meeting #94, Belgrade, Serbia, Oct. 12-16, 2015, Vodafone, "Correction of handling the NAS reject messages without Integrity protection," pp. 1-2.

C1-154300, XP051041488: 3GPP TSG WG1 Meeting #95, Anaheim, CA, USA, Nov. 16-20, 2015, Huawei, HiSilicon, "Discussion on denial of service (DoS) attack by using NAS reject messages," pp. 1-9.

3GPP TS 24.301, XP050996320: "3rd Generation Partnership Project; Technical Specification Group Core Network and Terminals; Non-Access Stratum (NAS) protocol for Evolved Packet System (EPS); Stage 3 (Release 13)" Mobile Competence Centre; Sophia-Antipolis Cedex, France, Sep. 25, 2015, pp. 1-394.

\* cited by examiner

OPERATION METHOD FOR PREVENTING LATENT ERRONEOUS OPERATION OF TERMINAL IN WIRELESS COMMUNICATION SYSTEM, AND APPARATUS FOR SAME

This application is a 35 USC § 371 National Stage entry of International Application No. PCT/KR2016/013176, filed on Nov. 16, 2016, and claims priority to U.S. Provisional Application No. 62/266,719, filed on Dec. 14, 2015, all of which are incorporated by reference in their entirety herein.

TECHNICAL FIELD

Following description relates to a wireless communication system, and more particularly, to a method of transmitting and receiving data by designing a new layer in a base station and an apparatus therefor.

BACKGROUND ART

Wireless access systems have been widely deployed to provide various types of communication services such as voice or data. In general, a wireless access system is a multiple access system that may support communication of multiple users by sharing available system resources (e.g., a bandwidth, transmission power, etc.). For example, multiple access systems include a Code Division Multiple Access (CDMA) system, a Frequency Division Multiple Access (FDMA) system, a Time Division Multiple Access (TDMA) system, an Orthogonal Frequency Division Multiple Access (OFDMA) system, a Single Carrier Frequency Division Multiple Access (SC-FDMA) system, and a multi carrier frequency division multiple access (MC-FDMA) system.

DISCLOSURE OF THE INVENTION

Technical Tasks

An object of the present invention is to enhance service quality by preventing a potential erroneous operation of a UE in a wireless communication system.

Another object of the present invention is to prevent a potential threat to a UE by recognizing fake or rogue entities existing within a network range.

The other object of the present invention is to minimize an impact influencing on a predefined signaling structure while preventing an inoperable status of a UE.

The technical problems solved by the present invention are not limited to the above technical problems and other technical problems which are not described herein will become apparent to those skilled in the art from the following description.

Technical Solution

To achieve these and other advantages and in accordance with the purpose of the present invention, as embodied and broadly described, according to one embodiment, a method of operating a UE (user equipment) for preventing a potential erroneous operation of the UE in a wireless communication system, includes the steps of transmitting an EMM (EPS Mobility Management) request message to a network entity, starting a timer for detecting a case of failing to receive an EMM response message together with the transmission of the EMM request message, receiving the EMM response message to which integrity protection is not applied, and waiting for an additional EMM response message while operating the timer without terminating the timer.

If the additional EMM response message is not received until the timer expires, the UE can process the received EMM response message.

If the additional EMM response message to which integrity protection is applied is received before the timer expires, the UE can discard the received EMM response message and process the additional EMM response message to which integrity protection is applied.

If the additional EMM response message to which integrity protection is not applied is received before the timer expires, the UE can process the received EMM response message and discard the additional EMM response message.

If the additional EMM response message to which integrity protection is not applied is received before the timer expires and two EMM response messages comprising the EMM response message and the additional EMM response message correspond to messages of a different type, the UE can terminate the timer and preferentially process a message expected in a process performed by the UE or a message of a logically high priority.

The waiting steps may comprise waiting for the additional EMM response message until the timing appearing prior to the expiry timing of the timer as much as a prescribed offset.

The EMM request message may correspond to one of an attach request message, a TAU (tracking area update) request message, or a service request message, and the timer may correspond to one of T3410, T3417, or T3430.

The received EMM response message can be temporarily stored in a buffer or a queue.

To further achieve these and other advantages and in accordance with the purpose of the present invention, according to a different embodiment, a UE (user equipment) operating to prevent a potential erroneous operation of the UE in a wireless communication system includes a transmitting unit, a receiving unit, and a processor configured to operate in a manner of being connected with the transmitting unit and the receiving unit, the processor configured to transmit an EMM (EPS Mobility Management) request message to a network entity, the processor configured to start a timer for detecting a case of failing to receive an EMM response message together with the transmission of the EMM request message, the processor configured to receive the EMM response message to which integrity protection is not applied, the processor configured to wait for an additional EMM response message while operating the timer without terminating the timer.

Advantageous Effects

As is apparent from the above description, the embodiments of the present invention have the following effects.

First of all, it is able to enhance service quality for a user by preventing an inoperable status of a UE in advance.

Secondly, since it is able to prevent attacks from malicious and fake entities existing in a network, it is able to more efficiently handle the attacks compared to follow-up measures.

Thirdly, since a legacy signaling structure requires less burden, it is able to minimize signaling overhead for achieving a goal.

The effects of the present invention are not limited to the above-described effects and other effects which are not described herein may be derived by those skilled in the art from the following description of the embodiments of the present invention. That is, effects which are not intended by the present invention may be derived by those skilled in the art from the embodiments of the present invention.

DESCRIPTION OF DRAWINGS

The accompanying drawings, which are included to provide a further understanding of the invention, illustrate embodiments of the invention and together with the description serve to explain the principle of the invention. The technical features of the present invention are not limited to specific drawings and the features shown in the drawings are combined to construct a new embodiment. Reference numerals of the drawings mean structural elements.

BEST MODE

Mode for Invention

Figure 1:
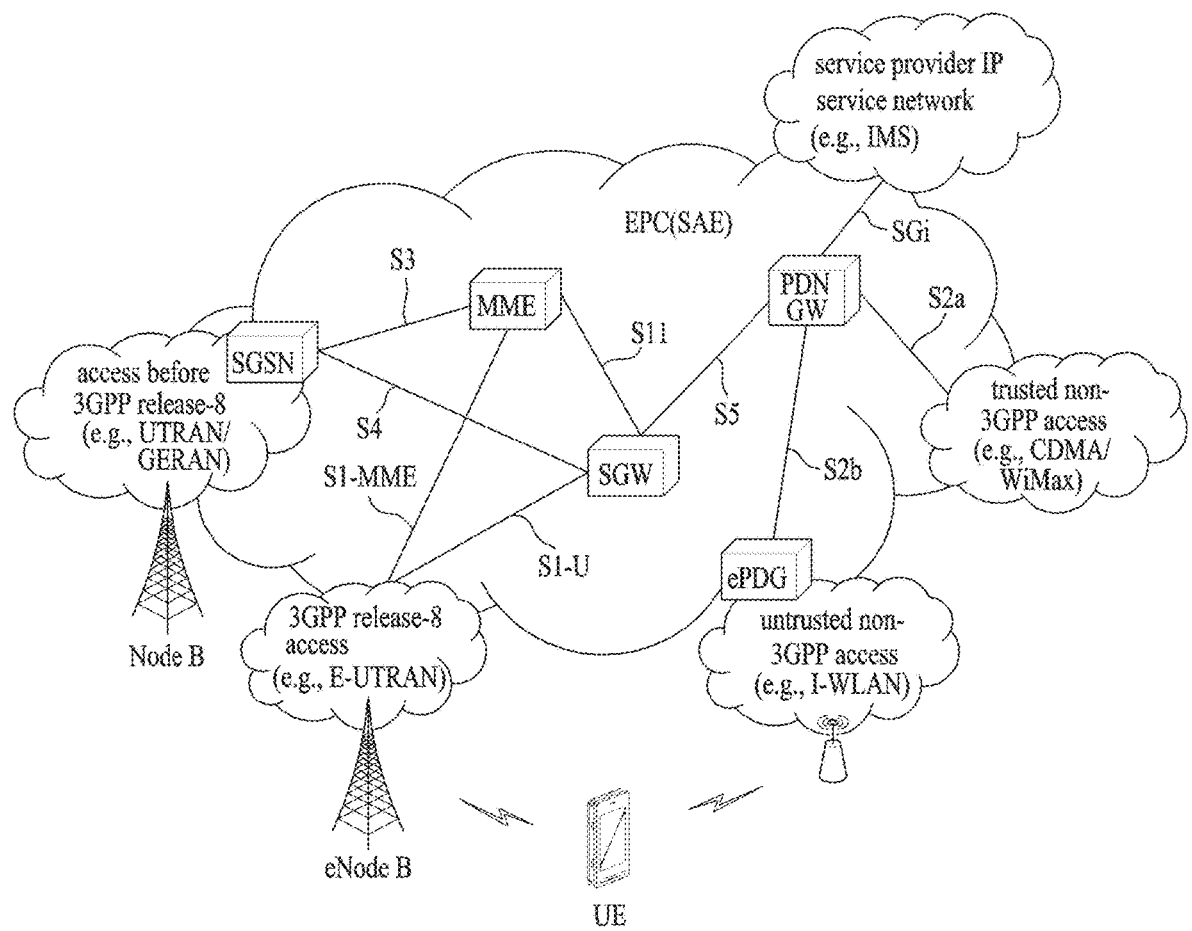
FIG. 1 is a diagram illustrating a brief structure of an evolved packet system (EPS) that includes an evolved packet core (EPC)

Although the terms used in the present invention are selected from generally known and used terms, terms used herein may be varied depending on operator's intention or customs in the art, appearance of new technology, or the like. In addition, some of the terms mentioned in the description of the present invention have been selected by the applicant at his or her discretion, the detailed meanings of which are described in relevant parts of the description herein. Furthermore, it is required that the present invention is understood, not simply by the actual terms used but by the meanings of each term lying within.

The following embodiments are proposed by combining constituent components and characteristics of the present invention according to a predetermined format. The individual constituent components or characteristics should be considered optional factors on the condition that there is no additional remark. If required, the individual constituent components or characteristics may not be combined with other components or characteristics. In addition, some constituent components and/or characteristics may be combined to implement the embodiments of the present invention. The order of operations to be disclosed in the embodiments of the present invention may be changed. Some components or characteristics of any embodiment may also be included in other embodiments, or may be replaced with those of the other embodiments as necessary.

In describing the present invention, if it is determined that the detailed description of a related known function or construction renders the scope of the present invention unnecessarily ambiguous, the detailed description thereof will be omitted.

In the entire specification, when a certain portion "comprises or includes" a certain component, this indicates that the other components are not excluded and may be further included unless specially described otherwise. The terms "unit", "-or/er" and "module" described in the specification indicate a unit for processing at least one function or operation, which may be implemented by hardware, software or a combination thereof. The words "a or an", "one", "the" and words related thereto may be used to include both a singular expression and a plural expression unless the context describing the present invention (particularly, the context of the following claims) clearly indicates otherwise.

The embodiments of the present invention can be supported by the standard documents disclosed in any one of wireless access systems, such as an IEEE 802.xx system, a 3rd Generation Partnership Project (3GPP) system, a 3GPP Long Term Evolution (LTE) system, and a 3GPP2 system. That is, the steps or portions, which are not described in order to make the technical spirit of the present invention clear, may be supported by the above documents.

In addition, all the terms disclosed in the present document may be described by the above standard documents. In particular, the embodiments of the present invention may be supported by at least one of P802.16-2004, P802.16e-2005, P802.16.1, P802.16p and P802.16.1b documents, which are the standard documents of the IEEE 802.16 system.

Hereinafter, the preferred embodiments of the present invention will be described with reference to the accompanying drawings. It is to be understood that the detailed description which will be disclosed along with the accompanying drawings is intended to describe the exemplary embodiments of the present invention, and is not intended to describe a unique embodiment which the present invention can be carried out.

It should be noted that specific terms disclosed in the present invention are proposed for convenience of description and better understanding of the present invention, and the use of these specific terms may be changed to another format within the technical scope or spirit of the present invention.

First of all, the terms used in this specification can be defined as follows.

UMTS (Universal Mobile Telecommunications System): a GSM (Global System for Mobile Communication) based third generation mobile communication technology developed by the 3GPP.

EPS (Evolved Packet System): a network system that includes an EPC (Evolved Packet Core) which is an IP (Internet Protocol) based packet switched core network and an access network such as LTE and UTRAN. This system is the network of an evolved version of the UMTS.

NodeB: a base station of GERAN/UTRAN. This base station is installed outdoor and its coverage has a scale of a macro cell.

eNodeB: a base station of LTE. This base station is installed outdoor and its coverage has a scale of a macro cell.

UE (User Equipment): the UE may be referred to as terminal, ME (Mobile Equipment), MS (Mobile Station), etc. Also, the UE may be a portable device such as a notebook computer, a cellular phone, a PDA (Personal Digital Assistant), a smart phone, and a multimedia device. Alternatively, the UE may be a non-portable device such as a PC (Personal Computer) and a vehicle mounted device. The term "UE", as used in relation to MTC, can refer to an MTC device.

HNB (Home NodeB): a base station of UMTS network. This base station is installed indoor and its coverage has a scale of a micro cell.

HeNB (Home eNodeB): a base station of an EPS network. This base station is installed indoor and its coverage has a scale of a micro cell.

MME (Mobility Management Entity): a network node of an EPS network, which performs mobility management (MM) and session management (SM).

PDN-GW (Packet Data Network-Gateway)/PGW: a network node of an EPS network, which performs UE IP address allocation, packet screening and filtering, charging data collection, etc.

SGW (Serving Gateway): a network node of an EPS network, which performs mobility anchor, packet routing, idle-mode packet buffering, and triggering of an MME's UE paging.

PCRF (Policy and Charging Rule Function): a network node of an EPS network performing policy decision to dynamically apply QoS and a charging policy differentiated according to a service flow OMA DM (Open Mobile Alliance Device Management): a protocol designed to manage a mobile device such as a cellular phone, a PDA, a mobile computer and the like. This protocol performs such a function as device configuration, firmware upgrade, error report and the like.

OAM (Operation Administration and Maintenance): a network management functional group for providing network flaw display, performance information, and data and diagnosis function.

NAS (Non-Access Stream): a higher stratum of a control plane between UE and MME. The NAS corresponds to a functional layer for transceiving signaling and traffic message between a UE and a core network in LTE/UMTS protocol stack. The NAS supports mobility of a UE, a session management procedure for establishing and managing IP connection between a UE and a PDN GW, and IP address management, etc.

AS (Access-Stratum): includes a protocol stack between a UE and a radio (or access) network and plays a role in transmitting data, network control signal, and the like.

NAS configuration MO (Management Object): MO (Management Object) used in a procedure for setting parameters related to NAS functionality to a UE.

PDN (Packet Data Network): a network in which a server supporting a specific service (e.g., a Multimedia Messaging Service (MMS) server, a Wireless Application Protocol (WAP) server, etc.) is located.

PDN connection: a logical connection between a UE and a PDN, represented as one IP address (one IPv4 address and/or one IPv6 prefix)

APN (Access Point Name): character string for indicating or identifying a PDN. In order to access a requested service or a network, it is necessary to undergo a specific P-GW. In this case, the APN corresponds to a name (character string) predefined in a network to discover the specific P-GW. (e.g., internet.mnc012.mcc345.gprs)

RAN (Radio Access Network): a unit including a Node B, an eNode B, and a Radio Network Controller (RNC) for controlling the Node B and the eNode B in a 3GPP network, which is present between UEs and provides a connection to a core network.

HLR (Home Location Register)/HSS (Home Subscriber Server): a database having subscriber information in a 3GPP network. The HSS can perform functions such as configuration storage, identity management, and user state storage.

PLMN (Public Land Mobile Network): a network configured for the purpose of providing mobile communication services to individuals. This network can be configured per operator.

ANDSF (Access Network Discovery and Selection Function): This is one of network entities for providing a policy for discovering and selecting an access that can be used by a UE on an operator basis.

1. Evolved Packet Core (EPC)

FIG. 1 is a schematic diagram showing the structure of an evolved packet system (EPS) including an evolved packet core (EPC).

The EPC is a core element of system architecture evolution (SAE) for improving performance of 3GPP technology. SAE corresponds to a research project for determining a network structure supporting mobility between various types of networks. For example, SAE aims to provide an optimized packet-based system for supporting various radio access technologies and providing an enhanced data transmission capability.

Specifically, the EPC is a core network of an IP mobile communication system for 3GPP LTE and can support real-time and non-real-time packet-based services. In conventional mobile communication systems (i.e. second-generation or third-generation mobile communication systems), functions of a core network are implemented through a circuit-switched (CS) sub-domain for voice and a packet-switched (PS) sub-domain for data. However, in a 3GPP LTE system which is evolved from the third generation communication system, CS and PS sub-domains are unified into one IP domain. That is, in 3GPP LTE, connection of terminals having IP capability can be established through an IP-based business station (e.g., an eNodeB (evolved Node B)), EPC, and an application domain (e.g., IMS). That is, the EPC is an essential structure for end-to-end IP services.

The EPC may include various components. FIG. 1 shows some of the components, namely, a serving gateway (SGW), a packet data network gateway (PDN GW), a mobility management entity (MME), a serving GPRS (general packet radio service) supporting node (SGSN) and an enhanced packet data gateway (ePDG).

The SGW operates as a boundary point between a radio access network (RAN) and a core network and maintains a data path between an eNodeB and the PDN GW. When. When a terminal moves over an area served by an eNodeB, the SGW functions as a local mobility anchor point. That is, packets. That is, packets may be routed through the SGW for mobility in an evolved UMTS terrestrial radio access network (E-UTRAN) defined after 3GPP release-8. In addition, the SGW may serve as an anchor point for mobility of another 3GPP network (a RAN defined before 3GPP release-8, e.g., UTRAN or GERAN (global system for mobile communication (GSM)/enhanced data rates for global evolution (EDGE) radio access network).

The PDN GW corresponds to a termination point of a data interface for a packet data network. The PDN GW may support policy enforcement features, packet filtering and charging support. In addition, the PDN GW may serve as an anchor point for mobility management with a 3GPP network and a non-3GPP network (e.g., an unreliable network such as an interworking wireless local area network (I-WLAN)

and a reliable network such as a code division multiple access (CDMA) or WiMax network).

Although the SGW and the PDN GW are configured as separate gateways in the example of the network structure of FIG. 1, the two gateways may be implemented according to a single gateway configuration option.

The MME performs signaling and control functions for supporting access of a UE for network connection, network resource allocation, tracking, paging, roaming and handover. The MME controls control plane functions associated with subscriber and session management. The MME manages numerous eNodeBs and signaling for selection of a conventional gateway for handover to other 2G/3G networks. In addition, the MME performs security procedures, terminal-to-network session handling, idle terminal location management, etc.

The SGSN handles all packet data such as mobility management and authentication of a user for other 3GPP networks (e.g., a GPRS network).

The ePDG serves as a security node for a non-3GPP network (e.g., an I-WLAN, a Wi-Fi hotspot, etc.).

As described above with reference to FIG. 1, a terminal having IP capabilities may access an IP service network (e.g., an IMS) provided by an operator via various elements in the EPC not only based on 3GPP access but also on non-3GPP access.

Additionally, FIG. 1 shows various reference points (e.g. S1-U, S1-MME, etc.). In 3GPP, a conceptual link connecting two functions of different functional entities of an E-UTRAN and an EPC is defined as a reference point. Table 1 is a list of the reference points shown in FIG. 1. Various reference points may be present in addition to the reference points in Table 1 according to network structures.

message, scheduling and transmission of a broadcast channel (BCH), dynamic allocation of resources to a UE on uplink and downlink, configuration and provision of eNodeB measurement, radio bearer control, radio admission control, and connection mobility control. In the EPC, paging generation, LTE_IDLE state management, ciphering of the user plane, SAE bearer control, and ciphering and integrity protection of NAS signaling.

Figure 3:
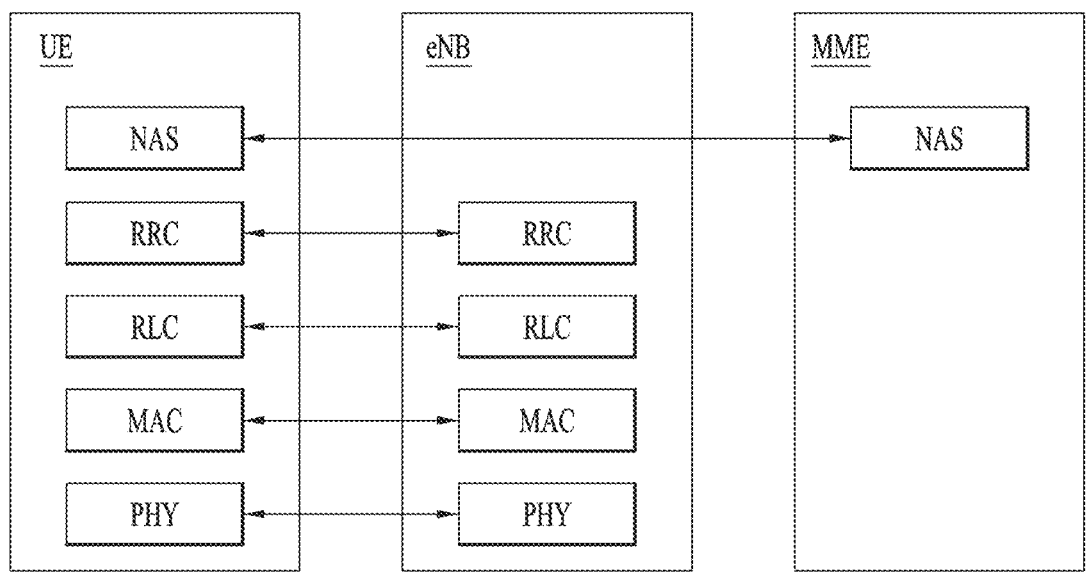
FIG. 3 is an exemplary diagram illustrating a structure of a radio interface protocol on a control plane.
Figure 4:
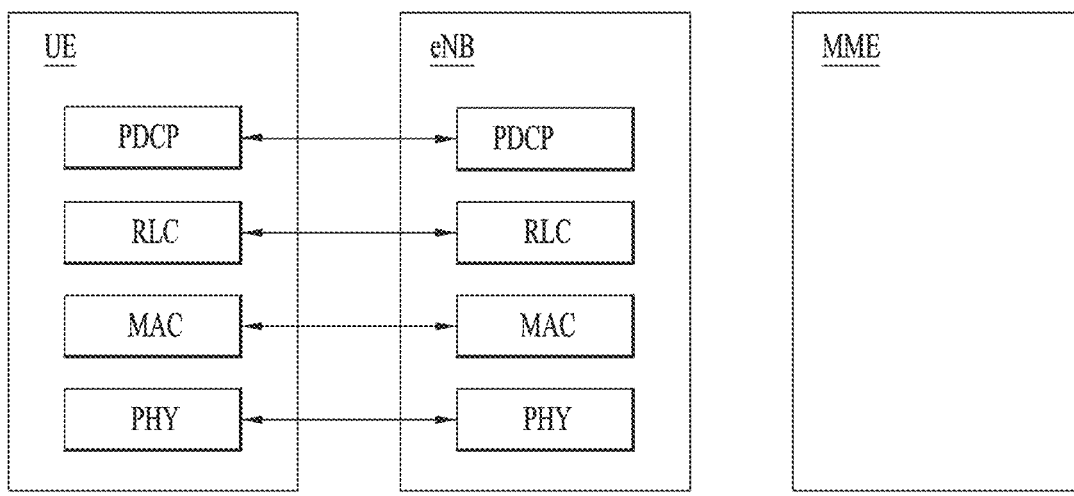
FIG. 4 is an exemplary diagram illustrating a structure of a radio interface protocol on a user plane.

FIG. 3 is a diagram exemplarily illustrating the structure of a radio interface protocol in a control plane between a UE and a base station, and FIG. 4 is a diagram exemplarily illustrating the structure of a radio interface protocol in a user plane between the UE and the base station.

The radio interface protocol is based on the 3GPP wireless access network standard. The radio interface protocol horizontally includes a physical layer, a data link layer, and a networking layer. The radio interface protocol is divided into a user plane for transmission of data information and a control plane for delivering control signaling which are arranged vertically.

The protocol layers may be classified into a first layer (L1), a second layer (L2), and a third layer (L3) based on the three sublayers of the open system interconnection (OSI) model that is well known in the communication system.

Hereinafter, description will be given of a radio protocol in the control plane shown in FIG. 3 and a radio protocol in the user plane shown in FIG. 4.

The physical layer, which is the first layer, provides an information transfer service using a physical channel. The physical channel layer is connected to a medium access control (MAC) layer, which is a higher layer of the physical layer, through a transport channel Data is transferred between the physical layer and the MAC layer through the

TABLE 1

| Reference point | Description |
|---|---|
| S1-MME | Reference point for the control plane protocol between E-UTRAN and MME |
| S1-U | Reference point between E-UTRAN and Serving GW for the per bearer user plane tunneling and inter eNodeB path switching during handover |
| S3 | It enables user and bearer information exchange for inter 3GPP access network mobility in idle and/or active state. This reference point can be used intra-PLMN or inter-PLMN (e.g. in the case of Inter-PLMN HO). |
| S4 | It provides related control and mobility support between GPRS Core and the 3GPP Anchor function of Serving GW. In addition, if Direct Tunnel is not established, it provides the user plane tunneling. |
| S5 | It provides user plane tunneling and tunnel management between Serving GW and PDN GW. It is used for Serving GW relocation due to UE mobility and if the Serving GW needs to connect to a non-collocated PDN GW for the required PDN connectivity. |
| S11 | Reference point between an MME and an SGW |
| SGi | It is the reference point between the PDN GW and the packet data network. Packet data network may be an operator external public or private packet data network or an intra operator packet data network, e.g. for provision of IMS services. This reference point corresponds to Gi for 3GPP accesses. |

Among the reference points shown in FIG. 1, S2a and S2b correspond to non-3GPP interfaces. S2a is a reference point which provides reliable non-3GPP access and related control and mobility support between PDN GWs to a user plane. S2b is a reference point which provides related control and mobility support between the ePDG and the PDN GW to the user plane.

Figure 2:
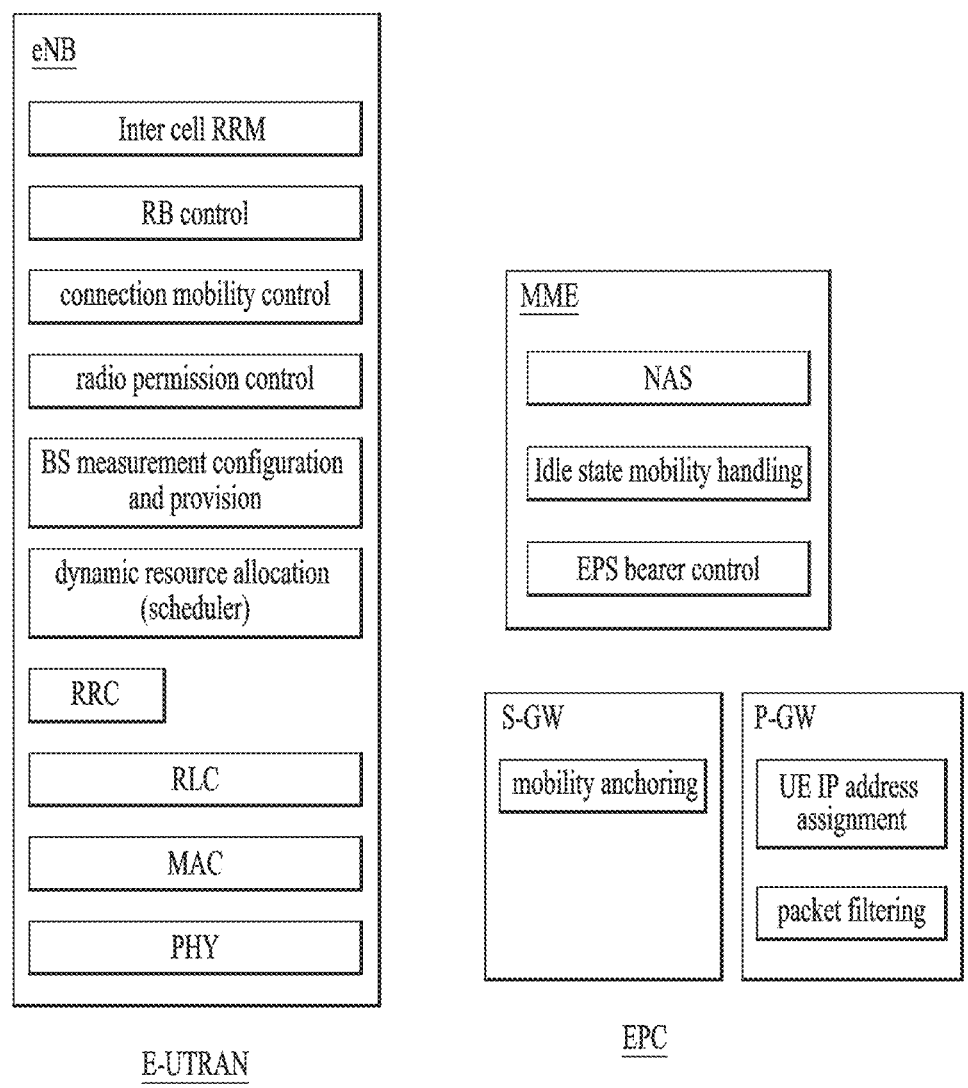
FIG. 2 is an exemplary diagram illustrating an architecture of a general E-UTRAN and a general EPC.

FIG. 2 is a diagram exemplarily illustrating architectures of a typical E-UTRAN and EPC.

As shown in the figure, while radio resource control (RRC) connection is activated, an eNodeB may perform routing to a gateway, scheduling transmission of a paging transport channel Transfer of data between different physical layers, i.e., a physical layer of a transmitter and a physical layer of a receiver is performed through the physical channel.

The physical channel consists of a plurality of subframes in the time domain and a plurality of subcarriers in the frequency domain. One subframe consists of a plurality of symbols in the time domain and a plurality of subcarriers. One subframe consists of a plurality of resource blocks. One resource block consists of a plurality of symbols and a plurality of subcarriers. A Transmission Time Interval (TTI), a unit time for data transmission, is 1 ms, which corresponds to one subframe.

According to 3GPP LTE, the physical channels present in the physical layers of the transmitter and the receiver may be divided into data channels corresponding to Physical Downlink Shared Channel (PDSCH) and Physical Uplink Shared Channel (PUSCH) and control channels corresponding to Physical Downlink Control Channel (PDCCH), Physical Control Format Indicator Channel (PCFICH), Physical Hybrid-ARQ Indicator Channel (PHICH) and Physical Uplink Control Channel (PUCCH).

The second layer includes various layers. First, the MAC layer in the second layer serves to map various logical channels to various transport channels and also serves to map various logical channels to one transport channel. The MAC layer is connected with an RLC layer, which is a higher layer, through a logical channel. The logical channel is broadly divided into a control channel for transmission of information of the control plane and a traffic channel for transmission of information of the user plane according to the types of transmitted information.

The radio link control (RLC) layer in the second layer serves to segment and concatenate data received from a higher layer to adjust the size of data such that the size is suitable for a lower layer to transmit the data in a radio interval.

The Packet Data Convergence Protocol (PDCP) layer in the second layer performs a header compression function of reducing the size of an IP packet header which has a relatively large size and contains unnecessary control information, in order to efficiently transmit an IP packet such as an IPv4 or IPv6 packet in a radio interval having a narrow bandwidth. In addition, in LTE, the PDCP layer also performs a security function, which consists of ciphering for preventing a third party from monitoring data and integrity protection for preventing data manipulation by a third party.

The Radio Resource Control (RRC) layer, which is located at the uppermost part of the third layer, is defined only in the control plane, and serves to configure radio bearers (RBs) and control a logical channel, a transport channel, and a physical channel in relation to reconfiguration and release operations. The RB represents a service provided by the second layer to ensure data transfer between a UE and the E-UTRAN.

If an RRC connection is established between the RRC layer of the UE and the RRC layer of a wireless network, the UE is in the RRC Connected mode. Otherwise, the UE is in the RRC Idle mode.

Hereinafter, description will be given of the RRC state of the UE and an RRC connection method. The RRC state refers to a state in which the RRC of the UE is or is not logically connected with the RRC of the E-UTRAN. The RRC state of the UE having logical connection with the RRC of the E-UTRAN is referred to as an RRC_CONNECTED state. The RRC state of the UE which does not have logical connection with the RRC of the E-UTRAN is referred to as an RRC_IDLE state. A UE in the RRC_CONNECTED state has RRC connection, and thus the E-UTRAN may recognize presence of the UE in a cell unit. Accordingly, the UE may be efficiently controlled. On the other hand, the E-UTRAN cannot recognize presence of a UE which is in the RRC_IDLE state. The UE in the RRC_IDLE state is managed by a core network in a tracking area (TA) which is an area unit larger than the cell. That is, for the UE in the RRC_IDLE state, only presence or absence of the UE is recognized in an area unit larger than the cell. In order for the UE in the RRC_IDLE state to be provided with a usual mobile communication service such as a voice service and a data service, the UE should transition to the RRC_CONNECTED state. A TA is distinguished from another TA by a tracking area identity (TAI) thereof. A UE may configure the TAI through a tracking area code (TAC), which is information broadcast from a cell.

When the user initially turns on the UE, the UE searches for a proper cell first. Then, the UE establishes RRC connection in the cell and registers information thereabout in the core network. Thereafter, the UE stays in the RRC_IDLE state. When necessary, the UE staying in the RRC_IDLE state selects a cell (again) and checks system information or paging information. This operation is called camping on a cell. Only when the UE staying in the RRC_IDLE state needs to establish RRC connection, does the UE establish RRC connection with the RRC layer of the E-UTRAN through the RRC connection procedure and transition to the RRC_CONNECTED state. The UE staying in the RRC_IDLE state needs to establish RRC connection in many cases. For example, the cases may include an attempt of a user to make a phone call, an attempt to transmit data, or transmission of a response message after reception of a paging message from the E-UTRAN.

The non-access stratum (NAS) layer positioned over the RRC layer performs functions such as session management and mobility management.

Hereinafter, the NAS layer shown in FIG. 3 will be described in detail.

The eSM (evolved Session Management) belonging to the NAS layer performs functions such as default bearer management and dedicated bearer management to control a UE to use a PS service from a network. The UE is assigned a default bearer resource by a specific packet data network (PDN) when the UE initially accesses the PDN. In this case, the network allocates an available IP to the UE to allow the UE to use a data service. The network also allocates QoS of a default bearer to the UE. LTE supports two kinds of bearers. One bearer is a bearer having characteristics of guaranteed bit rate (GBR) QoS for guaranteeing a specific bandwidth for transmission and reception of data, and the other bearer is a non-GBR bearer which has characteristics of best effort QoS without guaranteeing a bandwidth. The default bearer is assigned to a non-GBR bearer. The dedicated bearer may be assigned a bearer having QoS characteristics of GBR or non-GBR.

A bearer allocated to the UE by the network is referred to as an evolved packet service (EPS) bearer. When the EPS bearer is allocated to the UE, the network assigns one ID. This ID is called an EPS bearer ID. One EPS bearer has QoS characteristics of a maximum bit rate (MBR) and/or a guaranteed bit rate (GBR).

Figure 5:
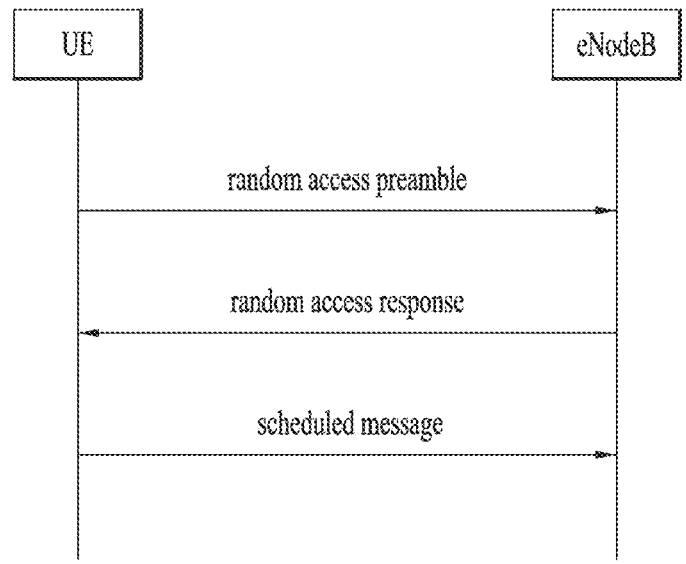
FIG. 5 is a flow chart illustrating a random access procedure.

FIG. 5 is a flowchart illustrating a random access procedure in 3GPP LTE.

The random access procedure is performed for a UE to obtain UL synchronization with an eNB or to be assigned a UL radio resource.

The UE receives a root index and a physical random access channel (PRACH) configuration index from an eNodeB. Each cell has 64 candidate random access preambles defined by a Zadoff-Chu (ZC) sequence. The root index is a logical index used for the UE to generate 64 candidate random access preambles.

Transmission of a random access preamble is limited to a specific time and frequency resources for each cell. The PRACH configuration index indicates a specific subframe and preamble format in which transmission of the random access preamble is possible.

The UE transmits a randomly selected random access preamble to the eNodeB. The UE selects a random access preamble from among 64 candidate random access preambles and the UE selects a subframe corresponding to the PRACH configuration index. The UE transmits the selected random access preamble in the selected subframe.

Upon receiving the random access preamble, the eNodeB sends a random access response (RAR) to the UE. The RAR is detected in two steps. First, the UE detects a PDCCH masked with a random access (RA)-RNTI. The UE receives an RAR in a MAC (medium access control) PDU (protocol data unit) on a PDSCH indicated by the detected PDCCH.

Figure 6:
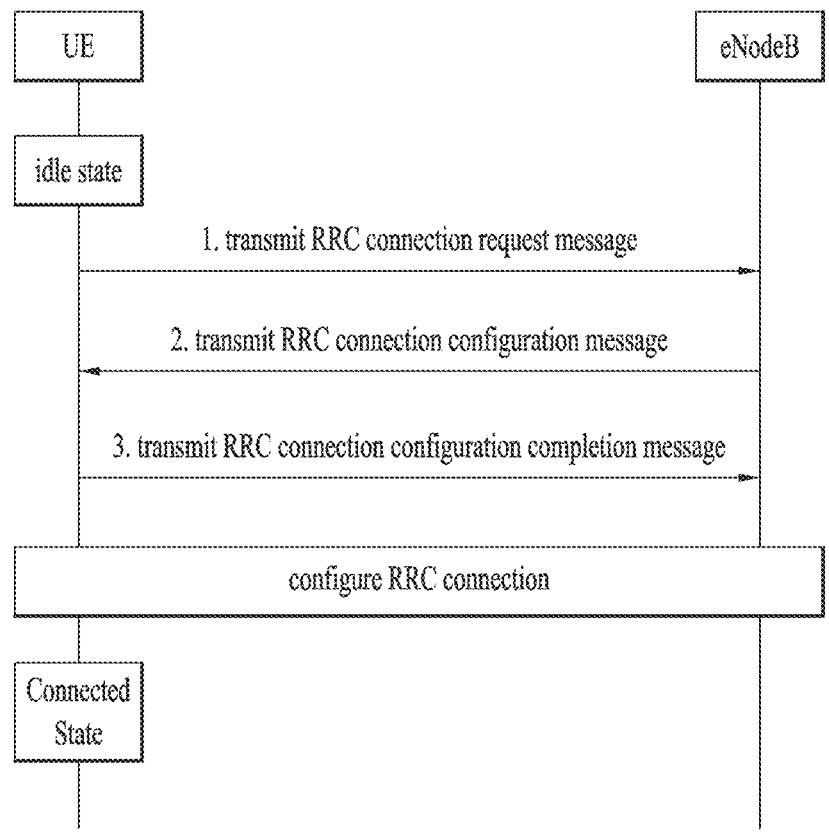
FIG. 6 is a diagram illustrating a connection procedure in a radio resource control (RRC) layer.

FIG. 6 illustrates a connection procedure in a radio resource control (RRC) layer.

As shown in FIG. 6, the RRC state is set according to whether or not RRC connection is established. An RRC state indicates whether or not an entity of the RRC layer of a UE has logical connection with an entity of the RRC layer of an eNodeB. An RRC state in which the entity of the RRC layer of the UE is logically connected with the entity of the RRC layer of the eNodeB is called an RRC connected state. An RRC state in which the entity of the RRC layer of the UE is not logically connected with the entity of the RRC layer of the eNodeB is called an RRC idle state.

A UE in the Connected state has RRC connection, and thus the E-UTRAN may recognize presence of the UE in a cell unit. Accordingly, the UE may be efficiently controlled. On the other hand, the E-UTRAN cannot recognize presence of a UE which is in the idle state. The UE in the idle state is managed by the core network in a tracking area unit which is an area unit larger than the cell. The tracking area is a unit of a set of cells. That is, for the UE which is in the idle state, only presence or absence of the UE is recognized in a larger area unit. In order for the UE in the idle state to be provided with a usual mobile communication service such as a voice service and a data service, the UE should transition to the connected state.

When the user initially turns on the UE, the UE searches for a proper cell first, and then stays in the idle state. Only when the UE staying in the idle state needs to establish RRC connection, the UE establishes RRC connection with the RRC layer of the eNodeB through the RRC connection procedure and then performs transition to the RRC connected state.

The UE staying in the idle state needs to establish RRC connection in many cases. For example, the cases may include an attempt of a user to make a phone call, an attempt to transmit data, or transmission of a response message after reception of a paging message from the E-UTRAN.

In order for the UE in the idle state to establish RRC connection with the eNodeB, the RRC connection procedure needs to be performed as described above. The RRC connection procedure is broadly divided into transmission of an RRC connection request message from the UE to the eNodeB, transmission of an RRC connection setup message from the eNodeB to the UE, and transmission of an RRC connection setup complete message from the UE to eNodeB, which are described in detail below with reference to FIG. 6.

1) When the UE in the idle state desires to establish RRC connection for reasons such as an attempt to make a call, a data transmission attempt, or a response of the eNodeB to paging, the UE transmits an RRC connection request message to the eNodeB first.

2) Upon receiving the RRC connection request message from the UE, the ENB accepts the RRC connection request of the UE when the radio resources are sufficient, and then transmits an RRC connection setup message, which is a response message, to the UE.

3) Upon receiving the RRC connection setup message, the UE transmits an RRC connection setup complete message to the eNodeB. Only when the UE successfully transmits the RRC connection setup message, does the UE establish RRC connection with the eNodeB and transition to the RRC connected mode.

Figure 7:
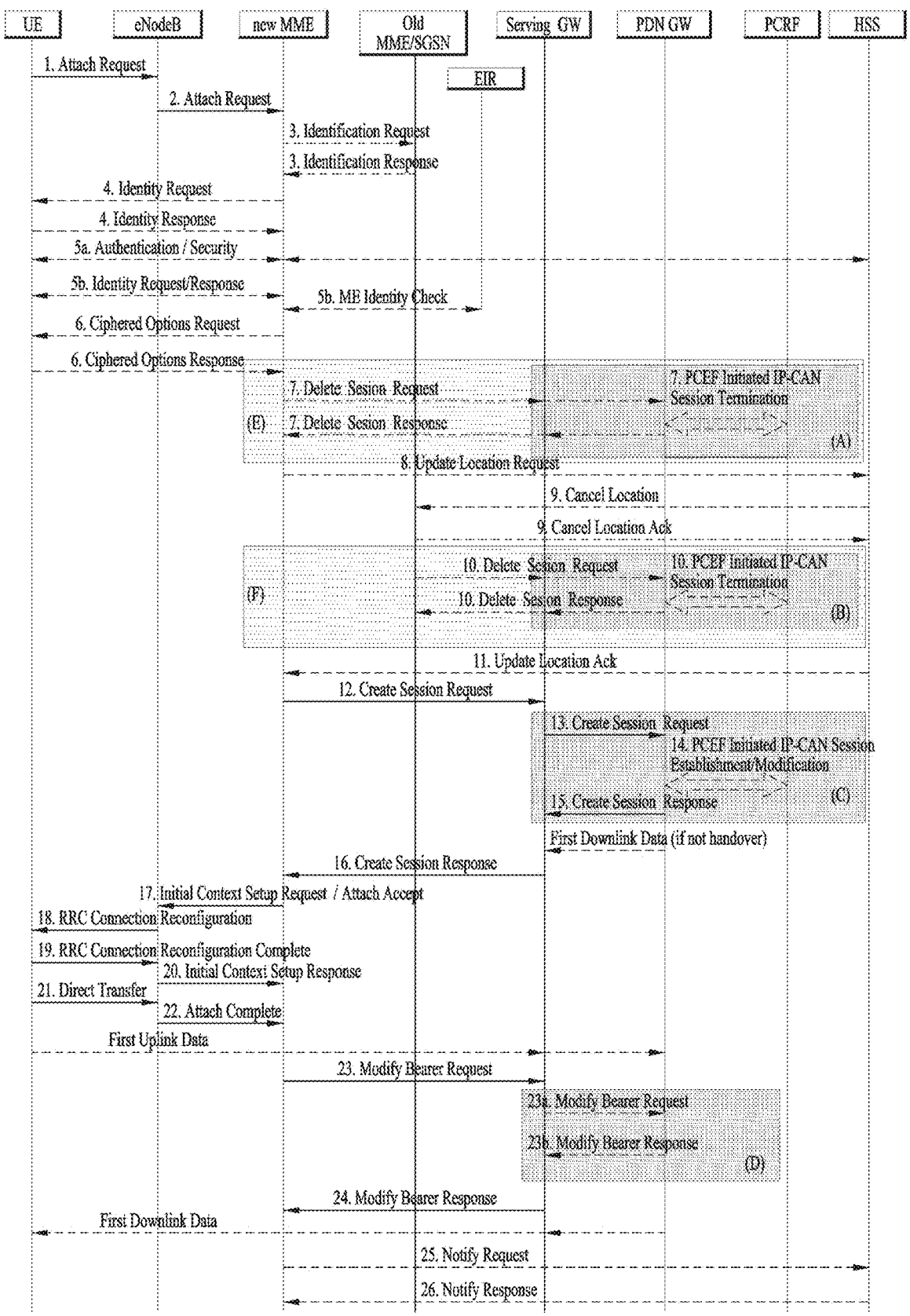
FIG. 7 is a diagram illustrating a network attach procedure of a UE.

FIG. 7 is a diagram illustrating a network attach procedure of a UE. The UE initiates accessing a network by forwarding an attach request message to an MME via an eNB. Having received the attach request message from the UE, the MME initiates a procedure (i.e., a procedure of receiving an IP) of establishing a PDN connection with the UE via an SGW and a PGW. In the attach procedure shown in FIG. 7, the UE establishes a security connection with the network through the steps 5a, 5b, and 17. In the steps 5a and 5b, a NAS secure connection is established via a NAS authentication procedure. Subsequently, AS security context is forwarded to the eNB via an S1AP message in attach accept procedure.

Basically, if there is a valid EPS security context, it is necessary to apply integrity protection to all NAS messages. The integrity protection corresponds to a procedure of adding a hash value of a prescribed length, which is generated using a unidirectional hash function and a key, or a signature to a message to authenticate that the message is not changed and the message is not made by a different entity. On the contrary, if messages are transmitted and received before a valid security connection is established, it is unable to apply the integrity protection to the messages. Hence, several EMM (EPS Mobility Management) messages defined in the section 4.4.4.2 of TS 24.301 are transmitted without application of the integrity protection. Examples of the messages, which are transmitted and received without the integrity protection, include an identity request message, an authentication request message, an authentication reject message, an attach reject message, a detach accept message, a TAU (tracking area update) reject message, a service reject message, and the like. Although the messages are received in a state there is no integrity protection, a UE should perform an operation according to the messages.

2. Proposed Operation Method of UE

Figure 8:
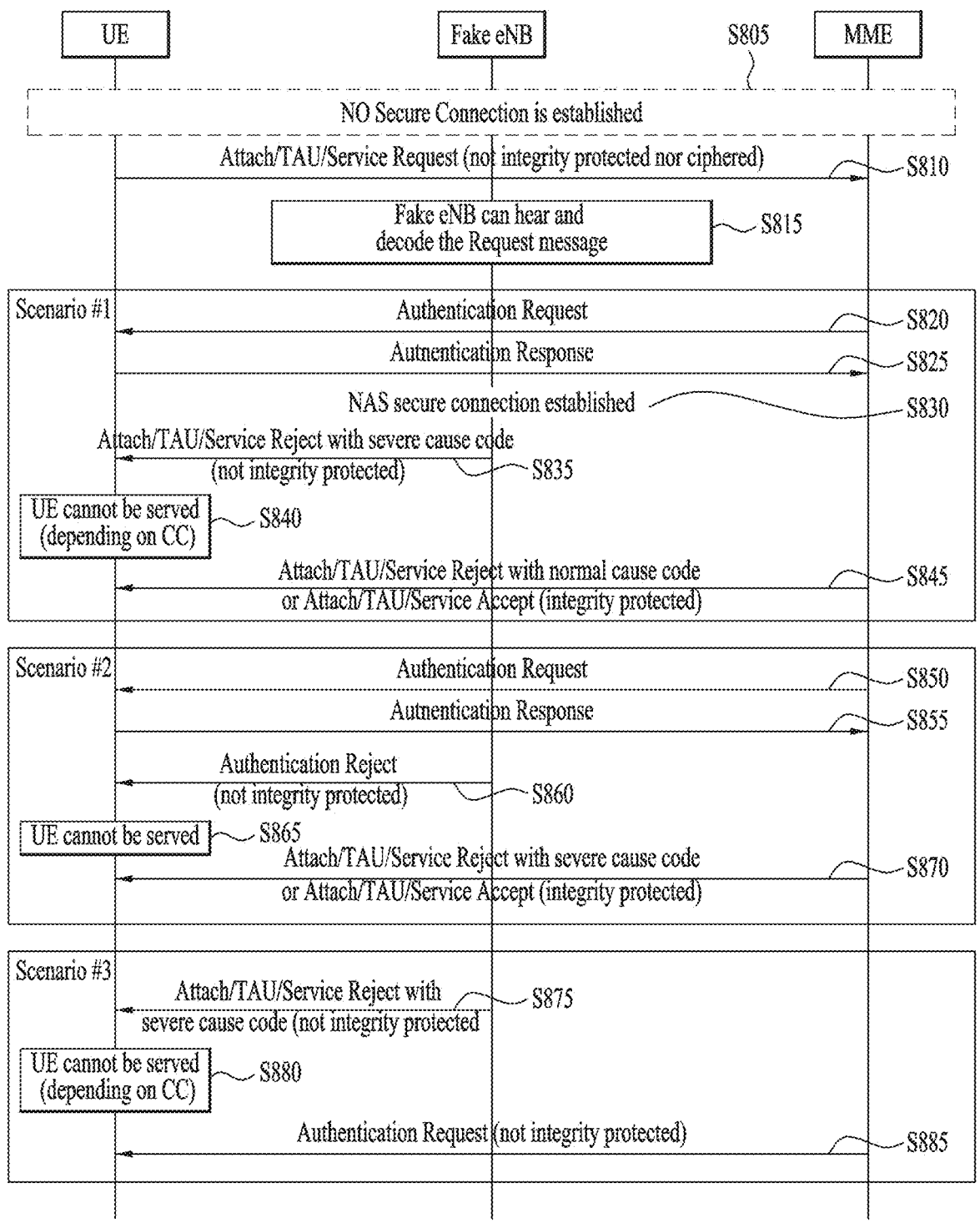
FIG. 8 is a diagram for explaining a problem according to the related art.

FIG. 8 is a diagram for explaining a problem according to the related art.

When a UE transmits a TAU request message to an MME in a NAS section to which integrity protection or ciphering is not applied [S805, S810], if a fake or rogue eNB exists within a range in which the message is forwarded, the fake eNB intercepts the unencrypted TAU request message and can check the contents of the TAU request message [S815]. Moreover, the fake eNB may transmit a TAU reject message to the UE and make the UE perform an erroneous operation. As a result, it may fail to provide a normal service to a user of the UE. This is because, as mentioned in the foregoing description, although several EMM messages (i.e., a TAU reject message, a service reject message, an attach reject message) defined in TS 24.301 are transmitted to the UE while the integrity protection is not applied to the messages, the UE allows the messages and performs an operation according to the messages.

In this situation, if the UE preferentially transmits an attach/TAU/service request message, the UE may receive not only a reject message transmitted by the fake eNB but also an accept/reject message transmitted by a normal eNB. In this case, an operation of the UE may become a problem.

In the following, problems capable of being occurred in the aforementioned situation are explained through a plurality of scenarios. First of all, according to a scenario #1 shown in FIG. 8, a UE transmits an attach/TAU/service request message to an MME. In this case, no valid security connection is established between the UE and a network (i.e., both integrity protection and ciphering are not applied) [S805, S810]. Since the request message transmitted by the UE is unencrypted, a fake eNB intercepts the request message, decodes the request message, and is able to check the contents of the request message [S815].

Since no secure connection is established between the UE and the network, the UE performs an authentication procedure with the MME [S820, S825]. If a NAS secure connection is established between the UE and the MME, integrity protection is applied to a NAS section between the MME and the UE [S830]. Yet, since AS secure context as a response message is forwarded to the UE via the eNB in response to the attach/TAU/service request message, there exists time before a secure connection is applied to an AS section.

Meanwhile, the fake eNB generates an attach/TAU/service reject message based on the message stolen from the UE and forwards the reject message to the UE [S835]. The reject message can include a cause code indicating a reject cause. For example, the fake eNB includes a cause code indicating a fatal error of the network in the reject message and can transmit the reject message to the UE. Meanwhile, although integrity protection is not applied to the reject message, the UE receives the reject message from the fake eNB and process the reject message [S840]. In particular, since the UE receives the reject message in response to an operation requested by the UE, the UE misunderstands that the UE has receives a normal attach/TAU/service reject message. As a result, the UE is in a state incapable of receiving a service from the network.

Meanwhile, after a fake EMM reject message is received from the fake eNB and the UE is in an inoperable state, the UE receives a normal attach/TAU/service accept message or a normal attach/TAU/service reject message (with normal cause code) from the MME [S845]. Although the message corresponds to a message to which integrity protection is applied, since the UE is already in the inoperable state, the UE is unable to normally process the message.

Subsequently, according to a scenario #2 shown in FIG. 8, similar to the scenario #1, the UE transmits an EMM request message (attach/TAU/service request message) to the MME. The fake eNB intercepts the EMM request message, decodes the EMM request message, and checks the contents of the EMM request message. Subsequently, the UE performs an authentication procedure to establish a secure connection with the MME [S850, S855]. In this case, the fake eNB can transmit an authentication reject message to the UE in response to an authentication response message transmitted by the UE [S855]. Since the authentication reject message corresponds to one of the messages defined in TS 24.301 which are processed without the application of the integrity protection, the UE operates according to the fake authentication reject message, switches an update state into EU3, and enters an inoperable state [S865].

Meanwhile, if the network receives the authentication response message transmitted by the UE [S855] and the authentication procedure is completed, the network transmits an accept message or a reject message to the UE in response to the EMM request message [S870]. However, the UE is already in a state incapable of receiving a service.

According to a scenario #3 shown in FIG. 8, similar to the scenario #1, the fake eNB transmits an EMM reject message to the UE before an authentication procedure is performed [S875]. Having received the EMM reject message from the fake eNB, the UE is in a state incapable of receiving a service [S880]. Although the MME transmits an authentication request message to the UE to establish a secure connection, the UE is unable to process the authentication request message [S885].

In the all three scenarios mentioned in FIG. 8, a problem occurs due to a reject message to which integrity protection is not applied transmitted by the fake eNB. Discussion on various solutions for the problem is in progress. As an example, a method of defining a new timer is proposed to periodically reset a list of forbidden cells/TAs/PLMNs and attempt a registration procedure again. However, the method has a limit in that the method minimizes unavailable service time only rather than defense an attack of the fake eNB.

In the following, a method for a UE to recognize the existence of a fake eNB in a situation that the fake eNB exists and a method capable of preventing or minimizing DoS (Denial of Service) attack and an erroneous operation of the UE are explained. First of all, a first embodiment for an operation method of a UE is explained with reference to FIGS. 9 and 10 in the following.

Figure 9:
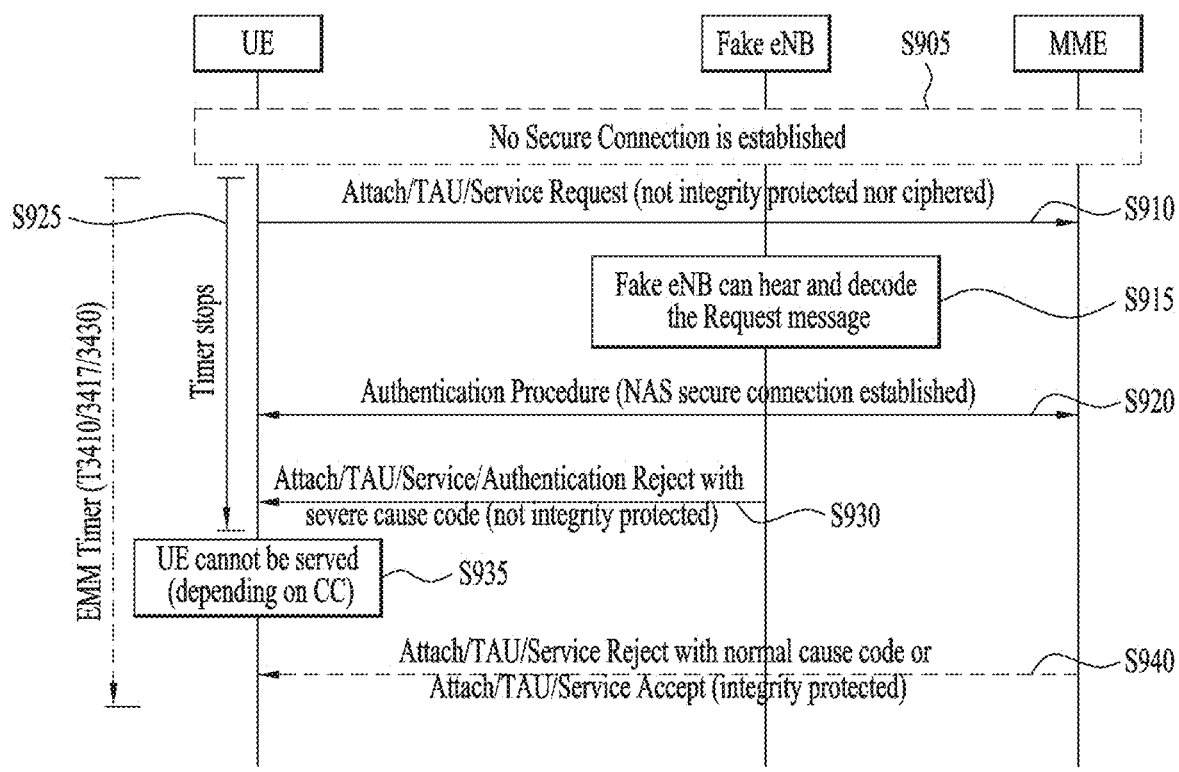
FIGS. 9 to 11 are flowcharts for explaining embodiments of the present invention.

First of all, an embodiment shown in FIG. 9 illustrates a procedure of using a legacy timer. If a secure connection is not established with a UE, the UE operates a timer for prescribed time while transmitting an EMM request message [S905, S910] to handle a case of failing to receive a response from a network. The NAS timer includes T3410 (attach procedure), T3417 (service request procedure), T3430 (TAU procedure), and the like. According to the legacy operation mentioned earlier in FIG. 8, if the UE receives an EMM message to which integrity protection is not applied from a fake eNB [S915, S930], the UE stops the timer and processes the received message [S925, S935]. As mentioned in the foregoing description, if the UE receives a fake EMM reject message, the UE enters an inoperable status and is unable to receive a normal EMM accept message or an EMM reject message of a different cause from the MME [S940].

Figure 10:
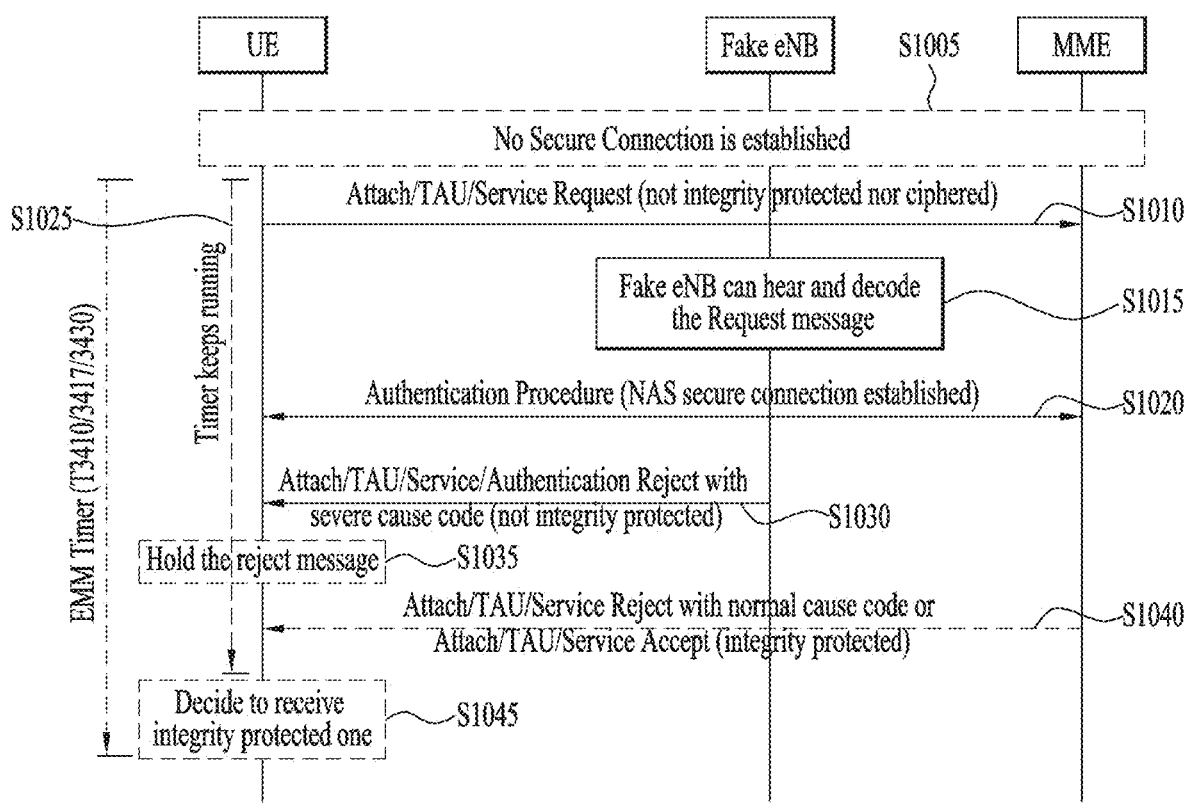

In FIG. 10, an operation method according to a proposed embodiment is disclosed. According to the proposed embodiment, if a UE receives a message to which integrity protection is not applied, the UE waits as much as prescribed time rather than immediately perform an operation according to the message [S1030]. If the UE receives an EMM message to which integrity protection is not applied, the UE continuously operates the timer, which is initiated at the time of transmitting an EMM request message, without stopping the timer [S1025]. In particular, the UE just remembers that the EMM message to which integrity protection is not applied has been received and does not immediately process the message [S1035]. In this case, the UE can temporarily store the firstly received EMM message via a buffer or a queue.

If the UE additionally receives a new EMM message from the network before the operating timer expires, since the UE knows that the stored EMM message and the new EMM message are duplicately received, the UE is able to recognize that a fake eNB exists in the network. Moreover, if the additionally received EMM message corresponds to a message to which integrity protection is applied, the UE is able to check that the message to which integrity protection is applied corresponds to a message normally received from the network and the temporarily stored message corresponds to a message transmitted from the fake eNB. Hence, the UE preferentially processes the message to which integrity protection is applied and discards the temporarily stored message to which integrity protection is not applied [S1045]. The timer, which is initiated at the time of transmitting the EMM request message, is terminated at the time of receiving the EMM message to which integrity protection is applied.

Meanwhile, when the UE stores an EMM message to which integrity protection is not applied and additionally receives a new EMM message before the timer expires, integrity protection may not be applied to the additionally received message as well. In particular, if the integrity protection is not applied to the two EMM messages, the UE may operate according to the previously received and stored message. In this case, the UE recognizes a possibility that a fake eNB exists in a current network range and may be able to perform additionally required operations. For example, when two messages are different from each other, if there is a message expected to be received by the UE in a procedure performed by the UE or a message of a logically high priority, the UE preferentially processes the message. In this case, the UE terminates the timer at the time of receiving the second EMM message.

Meanwhile, when the UE stores the firstly received EMM message and continuously operates the timer, if the timer arrives at the expiry timing while an additional message is not received (i.e., if one message is received only immediately before the timer expires), the UE processes the received EMM message and resets the timer. In other word, if one EMM response message is received only until random timing having a difference as much as a prescribed offset from the expiry timing of the timer, the UE stops the timer and processes the stored EMM response message. In this case, since it is different from a case that the timer expires while failing to receive an EMM response message, the UE can omit operations which are defined to be performed according to the expiration of the timer. In particular, the UE performs the operations according to the expiration of the timer only when an EMM response message is not received until the timer arrives at the expiry timing.

Figure 11:
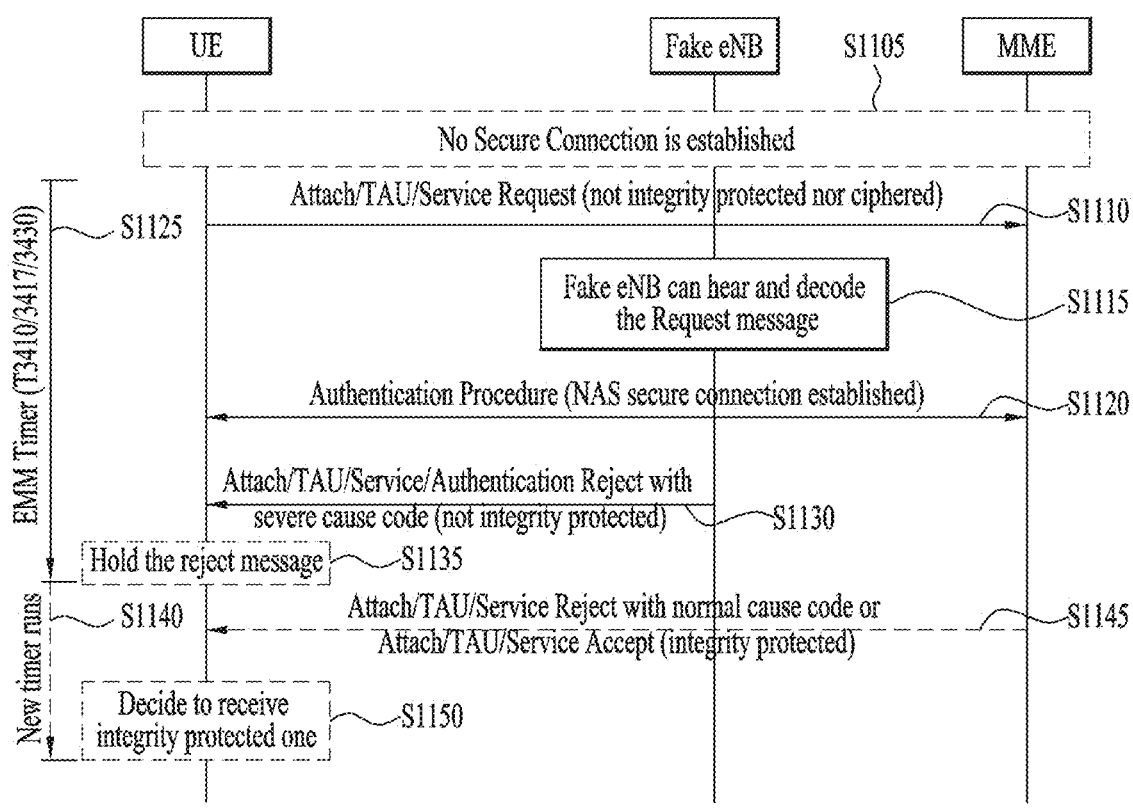

FIG. 11 illustrates a different embodiment for an operation method of a UE. According to the second embodiment, it is able to prevent or minimize an erroneous operation of the UE by defining a prescribed guard timer.

As mentioned in the foregoing description, although integrity protection is not applied to a response in response to several EMM request messages, the UE processes the response as it is. In particular, according to the scenarios #1 and 2 shown in FIG. 8, the UE transmits an EMM request message in a state that there is no valid secure connection and a network establishes a NAS secure connection via an authentication procedure [S1105 to S1120]. In this case, it is highly probable that integrity protection has been applied to an EMM accept message or an EMM reject message expected by the UE. In particular, if the UE receives a message to which integrity protection is applied after an authentication response message is transmitted to the network, the UE can immediately process the message.

On the contrary, if the UE receives a message to which integrity protection is not applied, the UE waits for a prescribed guard timer rather than immediately processes the received message [S1130, S1135]. The guard timer corresponds to a newly defined timer. If an EMM response message to which integrity protection is not applied is received in response to an EMM request message transmitted by the UE, the guard timer starts [S1140]. The UE can temporarily store the message to which integrity protection is not applied to a separate buffer or a queue at the time of initiating the timer.

The guard timer may operate within an expiry range of the timer mentioned earlier in FIG. 10 that starts at the time of transmitting an EMM request message. In particular, the guard timer may start at the time of receiving an EMM response message to which integrity protection is not applied and operate until the timer T3410/3417/3430 expires. The guard timer is terminated when the UE receives a second EMM response message.

If a new message to which integrity protection is applied is received before the guard timer expires, the UE preferentially processes the message to which integrity protection is applied and discards the stored message. The guard timer is terminated when the UE receives a second message. If an additional message is not received until the guard timer expires, the UE processes the stored message.

If a new message to which integrity protection is not applied is received before the guard timer expires, the UE processes the stored message. The UE recognizes that a fake eNB exists in a network range and performs an additional necessary operation. For example, when two messages are different from each other, if there is a message expected to be received by the UE in a procedure performed by the UE or a message of a logically high priority, the UE preferentially processes the message. Similarly, the guard timer is terminated at the time of receiving a second message.

Meanwhile, as mentioned earlier in the scenario #3 shown in FIG. 8, a UE may transmit an EMM request message in a state that a secure connection is not established and receive a reject message to which integrity protection is not applied from a fake eNB. In particular, since the UE does not start an authentication procedure, the UE may receive an EMM reject message in a state that a NAS secure connection is not established. In this case, similar to what is mentioned earlier in FIG. 10, the UE may continuously operate a timer, which has been initiated together with the transmission of the EMM request message, without terminating the timer. Or, similar to what is mentioned earlier in FIG. 11, the UE may start a guard timer after an EMM response message is received and expect to receive an additional EMM response message. The UE may operate according to the abovementioned two methods. If a new EMM response message is received, the UE discards a stored EMM reject message and operates according to the new message.

According to the aforementioned embodiments, a UE is able to prevent a problem due to DoS attack by recognizing the existence of a fake eNB and prevent a potential inoperable status of the UE due to the fake eNB, and the like.

3. Device Configurations

Figure 12:
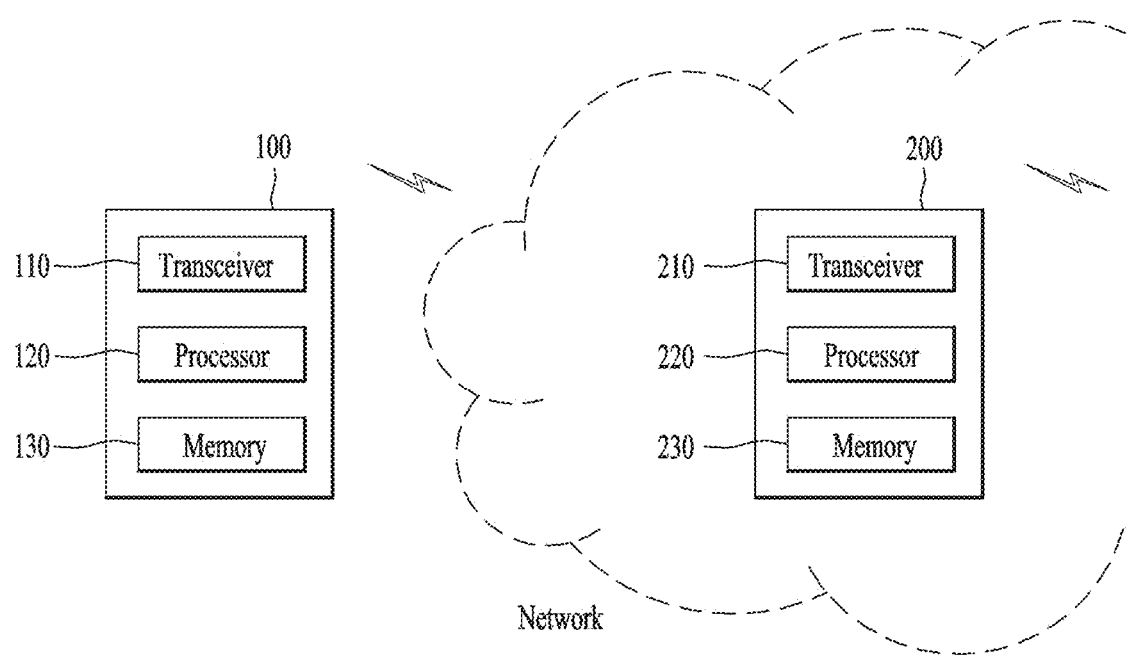
FIG. 12 is a diagram illustrating a configuration of a node device according to an embodiment of the present invention.

FIG. 12 is a diagram illustrating configurations of node devices according to a proposed embodiment.

A user equipment (UE) 100 may include a transceiver 110, a processor 120, and a memory 130. The transceiver 110 may be configured to transmit and receive various signals, data, and information to/from an external device. Alternatively, the transceiver 110 may be implemented with a combination of a transmitter and a receiver. The UE 100 may be connected to the external device by wire and/or wirelessly. The processor 120 may be configured to control overall operations of the UE 100 and process information to be transmitted and received between the UE 100 and the external device. Moreover, the processor 120 may be configured to perform the UE operation proposed in the present invention. The memory 130, which may be replaced with an element such as a buffer (not shown in the drawing), may store the processed information for a predetermined time.

Referring to FIG. 12, a network node 200 according to the present invention may include a transceiver 210, a processor 220, and a memory 230. The transceiver 210 may be configured to transmit and receive various signals, data, and information to/from an external device. The network node 200 may be connected to the external device by wire and/or wirelessly. The processor 220 may be configured to control overall operations of the network node 200 and process information to be transmitted and received between the network node device 200 and the external device. Moreover, the processor 220 may be configured to perform the network node operation proposed in the present invention. The memory 230, which may be replaced with an element such as a buffer (not shown in the drawing), may store the processed information for a predetermined time.

The specific configurations of the UE 100 and the network node 200 may be implemented such that the aforementioned various embodiments of the present invention can be independently applied or two or more embodiments can be simultaneously applied. For clarity, redundant description will be omitted.

The embodiments of the present invention may be implemented using various means. For instance, the embodiments of the present invention may be implemented using hardware, firmware, software and/or any combinations thereof.

In case of the implementation by hardware, a method according to each embodiment of the present invention may be implemented by at least one selected from the group consisting of ASICs (application specific integrated circuits), DSPs (digital signal processors), DSPDs (digital signal processing devices), PLDs (programmable logic devices), FPGAs (field programmable gate arrays), processor, controller, microcontroller, microprocessor and the like.

In case of the implementation by firmware or software, a method according to each embodiment of the present invention can be implemented by modules, procedures, and/or functions for performing the above-explained functions or operations. Software code may be stored in a memory unit and be then executed by a processor. The memory unit may be provided within or outside the processor to exchange data with the processor through the various means known to the public.

As mentioned in the foregoing description, the detailed descriptions for the preferred embodiments of the present invention are provided to be implemented by those skilled in the art. While the present invention has been described and illustrated herein with reference to the preferred embodiments thereof, it will be apparent to those skilled in the art that various modifications and variations can be made therein without departing from the spirit and scope of the invention. Therefore, the present invention is non-limited by the embodiments disclosed herein but intends to give a broadest scope matching the principles and new features disclosed herein.

INDUSTRIAL APPLICABILITY

The aforementioned operation method of the UE can be applied not only to 3GPP system but also to various wireless communication systems including an IEEE 802.16x system and IEEE 802.11x system. Further, the proposed method can also be applied to an mmWave communication system using super-high frequency band.

What is claimed is:

1. A method of operating a user equipment (UE) for preventing a potential erroneous operation of the UE in a wireless communication system, the method comprising:
    transmitting an EMM (EPS Mobility Management) request message to a network entity;
    starting a timer for detecting a failure to receive an EMM response message to the EMM request message;
    receiving one or more EMM response messages prior to the timer expiring; and
    processing a first received EMM response message among the received one or more EMM response messages or processing an EMM response message to which integrity protection is applied, based on whether the EMM response message to which integrity protection is applied is received prior to the timer expiring,
    wherein when one EMM response message to which integrity protection is not applied and one EMM response message to which integrity protection is applied are received before the timer expires, the UE terminates the timer, discards the received EMM response message to which the integrity protection is not applied, and processes the EMM response message to which integrity protection is applied.

2. The method of claim 1, wherein when only one EMM response message is received prior to the timer expiring, and the one EMM response message is a message to which integrity protection is not applied, the UE terminates the timer and processes the received EMM response message.

3. The method of claim 1, wherein when two EMM response messages to which integrity protection is not applied are received prior to the timer expiring, and no EMM response messages to which integrity protection is applied are received prior to the timer expiring, the UE terminates the timer, processes the first received EMM response message among the two EMM response messages, and discards the remaining received EMM response message among the two EMM response messages.

4. The method of claim 1, wherein when two EMM response messages to which the integrity protection is not applied are received prior to the timer expiring, and no EMM response messages to which integrity protection is applied are received prior to the timer expiring, and the two received EMM response messages correspond to messages of a different type, the UE terminates the timer and preferentially processes the one received message expected in a process performed by the UE or the one received message that has a logically higher priority.

5. The method of claim 1,
    wherein the one or more EMM request messages correspond to one of an attach request message, a tracking area update (TAU) request message, or a service request message, and
    wherein the timer corresponds to one of T3410, T3417, or T3430.

6. The method of claim 1, wherein when the integrity protection is not applied to the first received EMM response message, the first received EMM response message is temporarily stored in a buffer or a queue.

7. A user equipment (UE) operating to prevent a potential erroneous operation of the UE in a wireless communication system, the UE comprising:
    a transmitter;
    a receiver; and
    a processor operatively connected with the transmitter and the receiver,
    wherein the processor is configured to:
    transmit an EMM (EPS Mobility Management) request message to a network entity;
    start a timer for detecting a failure to receive an EMM response message to the EMM request message;
    receive one or more EMM response messages prior to the timer expiring; and
    process a first received EMM response message among the received one or more EMM response messages or process an EMM response message to which integrity protection is applied, based on whether the EMM response message to which integrity protection is applied is received prior to the timer expiring, wherein when one EMM response message to which integrity protection is not applied and one EMM response message to which integrity protection is applied are received before the timer expires, the processor is further configured to discard the received EMM response message to which the integrity protection is not applied and process the EMM response message to which integrity protection is applied.

8. The UE of claim 7, when only one EMM response message is not applied is received prior to the timer expiring, and the one EMM response message is a message to which integrity protection is not applied, the processor is further configured to terminate the timer and process the received EMM response message.

9. The UE of claim 7, wherein when two EMM response messages to which integrity protection is not applied are received prior to the timer expiring, and no EMM response messages to which integrity protection is applied are received prior to the timer expiring, the processor is further configured to terminates the timer and process the first received EMM response message among the two EMM response messages, and discard the remaining received EMM response message among the two EMM response messages.

10. The UE of claim 7, wherein when two EMM response messages to which the integrity protection is not applied are received prior to the timer expiring, and no EMM response messages to which integrity protection is applied are received prior to the timer expiring, and the two received EMM response messages correspond to messages of a different type, the UE terminates processor is further configured to terminate the timer and preferentially processes a process the one received message expected in a process performed by the UE or the one received message that has a logically higher priority.

11. The UE of claim 7,
wherein the one or more EMM request messages correspond to one of an attach request message, a tracking area update (TAU) request message, or a service request message, and
wherein the timer corresponds to one of T3410, T3417, or T3430.

12. The UE of claim 7, wherein when the integrity protection is not applied to the first received EMM response message, the first received EMM response message is temporarily stored in a buffer or a queue.

* * * * *